(12) United States Patent
Keigley

(10) Patent No.: US 7,478,682 B1
(45) Date of Patent: Jan. 20, 2009

(54) SCARIFYING RAKE DRAG

(75) Inventor: Kevin V. Keigley, Osceola, IN (US)

(73) Assignee: Absolute Innovations, Inc., Osceola, IN (US)

( * ) Notice: Subject to any disclaimer, the term of this patent is extended or adjusted under 35 U.S.C. 154(b) by 366 days.

(21) Appl. No.: 10/990,330

(22) Filed: Nov. 16, 2004

Related U.S. Application Data

(63) Continuation of application No. 10/675,395, filed on Sep. 30, 2003, now abandoned.

(51) Int. Cl.
*A01B 49/02* (2006.01)

(52) U.S. Cl. .................................. 172/145; 172/684.5

(58) Field of Classification Search ......... 172/195–200, 172/663–668, 449, 445.1, 777, 145
See application file for complete search history.

(56) References Cited

U.S. PATENT DOCUMENTS

| | | | | |
|---|---|---|---|---|
| 1,447,862 A * | 3/1923 | Jones | ........................... | 172/191 |
| 1,585,307 A * | 5/1926 | Maney | ........................ | 172/197 |
| 1,969,684 A * | 8/1934 | Bird | ............................ | 172/413 |
| 2,691,930 A * | 10/1954 | Forgy | ........................... | 172/328 |
| 2,994,388 A * | 8/1961 | Ryan | ........................... | 172/635 |
| 3,613,802 A * | 10/1971 | Carlson et al. | ............... | 172/457 |
| 3,774,694 A * | 11/1973 | Gates | .......................... | 172/617 |
| 3,774,695 A * | 11/1973 | Voorhees | ..................... | 172/691 |
| 3,776,317 A * | 12/1973 | Royer | ......................... | 172/777 |
| 3,835,932 A * | 9/1974 | Mitchell | ...................... | 172/197 |
| 4,106,568 A * | 8/1978 | Cline | .......................... | 172/327 |
| 4,196,778 A * | 4/1980 | Smith | ....................... | 172/445.1 |
| 4,217,962 A * | 8/1980 | Schaefer | ..................... | 172/197 |
| 4,472,930 A * | 9/1984 | Smith | ........................... | 56/396 |
| 4,535,847 A * | 8/1985 | Hasegawa et al. | ............... | 172/2 |
| 4,967,850 A * | 11/1990 | Bargfrede et al. | ........... | 172/197 |
| 5,211,247 A * | 5/1993 | Johnsen | ...................... | 172/197 |
| 5,265,975 A * | 11/1993 | Scott | ........................... | 404/94 |
| 5,407,015 A * | 4/1995 | Swords et al. | ............... | 172/200 |
| 5,806,605 A * | 9/1998 | Keigley | ...................... | 172/145 |
| 5,829,536 A * | 11/1998 | Pigg et al. | .................... | 172/482 |
| 5,890,545 A * | 4/1999 | Smith et al. | ................. | 172/200 |
| 5,911,279 A * | 6/1999 | Whitener | ..................... | 172/668 |
| 6,085,847 A * | 7/2000 | Lange et al. | ................. | 172/197 |

* cited by examiner

*Primary Examiner*—Thomas B Will
*Assistant Examiner*—Alicia Torres
(74) *Attorney, Agent, or Firm*—Botkin & Hall, LLP

(57) ABSTRACT

A soil working implement for being dragged behind a towing vehicle. The implement includes a hitch part and a soil working part. The soil working part may be pivoted about the hitch part by extending or retracting a longitudinal linkage member interposed between the hitch part and the soil working part.

3 Claims, 3 Drawing Sheets

SCARIFYING RAKE DRAG

CROSS-REFERENCE TO RELATED APPLICATION

This is a continuation of application Ser. No. 10/675,395, filed Sep. 30, 2003 now abandoned.

BACKGROUND OF THE INVENTION

1. Field of the Invention

The invention disclosed herein relates to a soil working implement, and more specifically, to an implement that includes both scarifying teeth and a smoothing rake for dragging on the soil behind a tow vehicle.

2. Discussion of Background Art

Landscaping professionals and dirt arena caretakers often need an implement for working the soil that can both loosen the soil and also smooth the soil. Many such implements are known. One example of such an implement is the soil working implement disclosed in U.S. Pat. No. 5,806,605 to Keigley, which discloses an implement towed behind a tow vehicle that grades, works, and scarifies soil. This implement is adapted for being hitched to a three-point hitch on the tow vehicle so that the implement may be vertically and rotationally controlled with the tow vehicle's hitch. Another example of such an implement is disclosed in U.S. Pat. No. 5,515,625 to Keigley. This implement is adapted for being hitched to the forward lift arms of an operating vehicle. A problem with both these types of implement, however, is that it takes a skilled operator in a specially adapted vehicle to correctly work the implement without disturbing the soil in a detrimental manner. Unfortunately, a skilled operator is often not available for landscapers and arena caretakers. Therefore, it would be advantageous to have a soil working implement that can both loosen the soil and smooth the soil and that can be easily operated by an unskilled operator from a relatively unspecialized vehicle.

SUMMARY OF THE INVENTION

An implement for working soil is disclosed which may be hitched to a tow vehicle for towing the implement over the soil. The implement includes a soil working part for engaging the soil and a hitch part for connection to the tow vehicle. The hitch part is pivotally connected to the soil working part. An extensible linkage is connected to the soil working part such that the soil working part may be pivotally shifted about the hitch part by extending or retracting the link.

An object of the invention is to provide an easy to use soil working implement which both loosens the soil and smoothes the soil. Another object of the invention is to provide such an implement that may be towed behind a vehicle by any convenient means. Another object of the invention is to provide such an instrument in which the amount of loosening or smoothing performed by the implement on the soil may be easily adjusted.

BRIEF DESCRIPTION OF THE DRAWINGS

These and other aspects of the invention will be apparent from the following description, with reference to the accompanying drawings, in which.

DETAILED DESCRIPTION

Figure 1:
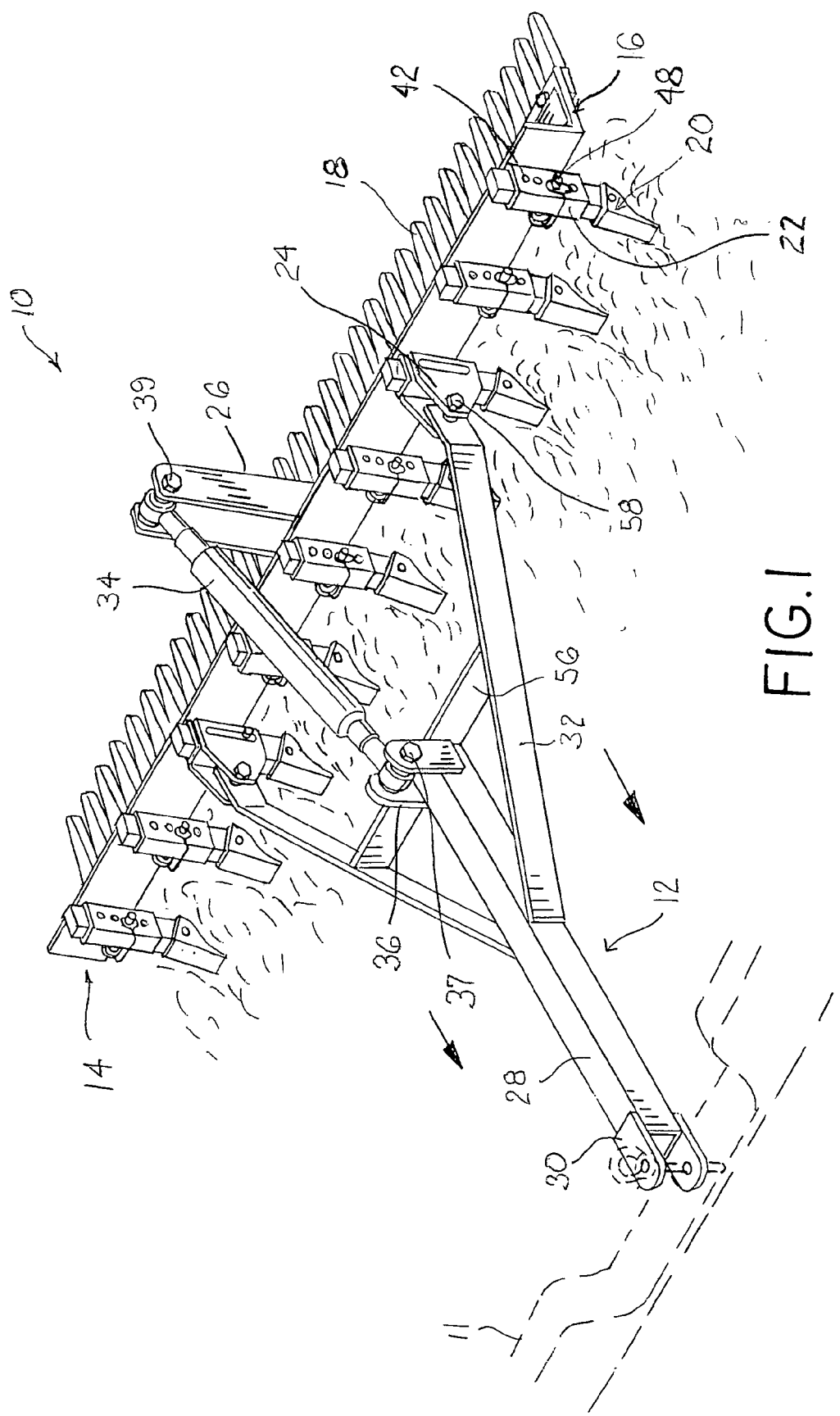
FIG. 1 is a perspective view of the preferred embodiment of the implement being towed from a tow vehicle.
Figure 2:
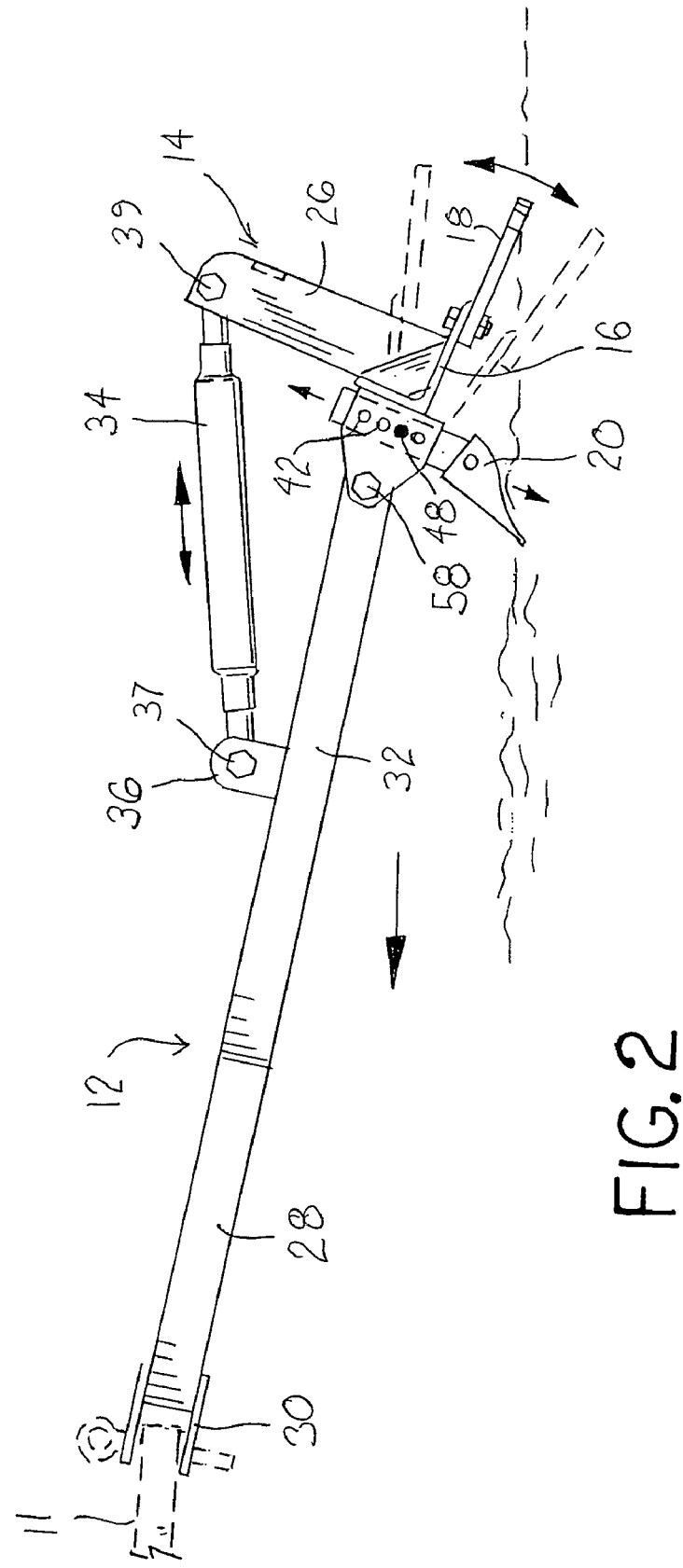
FIG. 2 is a side view of the implement showing in broken lines an angularly adjusted positions of its soil working part.
Figure 3:
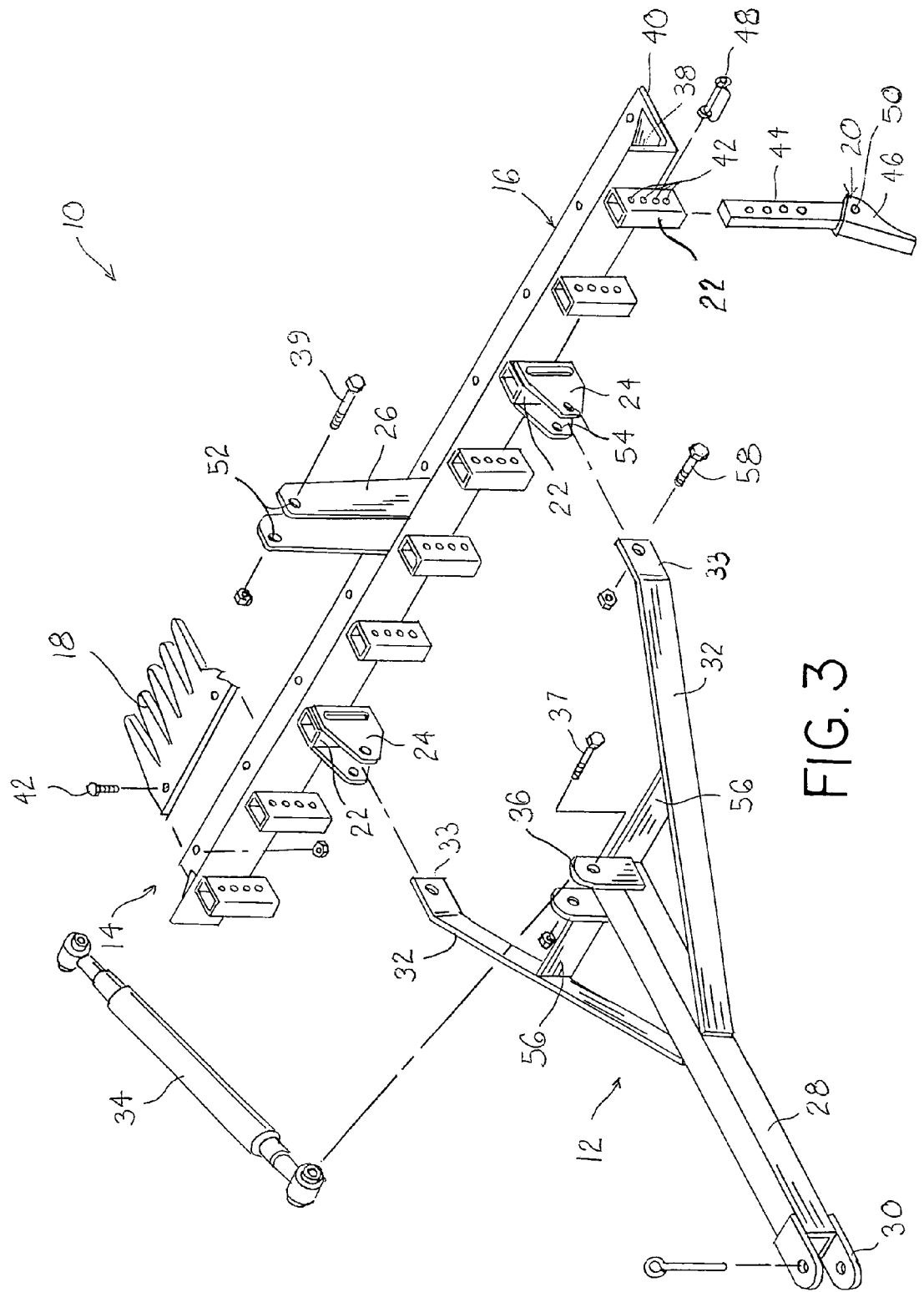
FIG. 3 is an exploded view of the several parts of the implement indicating their assemblage.

Referring now to the drawings, a drag behind soil working implement 10 includes a hitch part 12 and a soil working part 14. Soil working part 14 includes a transverse frame member 16 carrying raking tines 18 and scarifying teeth 20. Hitch part 12 includes a longitudinal hitch bar 28, a hitch 30, and an extensible and retractable turnbuckle 34. Implement 10 is hitched to a tow vehicle 11 (shown partially in broken lines) by securing hitch 30 to the tow vehicle's hitch in any convenient manner such that the tow vehicle can drag the implement behind it over a path of soil.

Focusing now on soil working part 14, frame member 16 is generally a piece of angle structural steel having a generally vertical upwardly oriented leg 38 and a generally horizontal rearwardly oriented leg 40. Tines 18 are secured along the length of horizontal leg 40 with fasteners 42. Tines 18 are longitudinally oriented in a plane extending behind frame member 16 and transversely spaced from each other to allow soil to pass between adjacent tines while also smoothing the soil when pulled over the soil. A plurality of scarifying teeth 20 are located along frame member 16 transversely spaced from each other and downwardly oriented for penetration into the soil to scarify the soil when dragged across the soil. Each tooth 20 is carried within a tooth bracket 22 carried by the vertical leg 38 of frame member 16. Each bracket 22 is generally a length of structural tube steel with a plurality of vertically spaced opposed aligned holes 42 through opposite sides of the bracket walls. Each tooth 20 includes a mounting bar 44 for mounting to brackets 22 and a tooth portion 46 for penetration into the soil. Mounting bar 44 is a length of bar stock steel with holes through it for insertion into bracket 22. Tooth portion 42 is removably mounted to mounting bar 44 with a fastener 50, which allows a worn tooth to be easily replaced with a new one. Each tooth 20 is secured within each bracket 22 by aligning a hole on bar 44 with one of the aligned sets of bracket holes 42 and then inserting a retaining pin 48 through the aligned set of holes. A hitch bracket 26 is carried by frame member 16 and extends above the frame member. Hitch bracket 26 includes a pair of aligned pin holes 52. An aligned hitch bracket 24 is carried on each opposite side of hitch bracket 26 by a selected pair of brackets 22. Brackets 24 are equally and oppositely laterally spaced from bracket 26. Each bracket 24 includes a pair of aligned pin holes 54 for accepting a retaining pin.

On hitch part 12, hitch 30 is carried on one end of hitch bar 28. Hitch 30 is preferably a single point hitch such as a typical tongue and groove hitch or other such hitch that does not provide for orientational control of the implement. A turnbuckle bracket 36 is carried at the opposite end of hitch bar 28 and is adapted to be pivotally secured to one end of turnbuckle 34 with a pin 37. A mounting bar 32 is carried on each opposite side of hitch bar 28 at a medial point along hitch bar 28 and extends angularly behind and horizontally aligned with the bracket end of the hitch bar. A brace 56 extends across hitch bar 28 and between mounting bars 32 to provide lateral stability to implement 10 when being towed. The free end 33 of each mounting bar is pivotally secured to hitch brackets 24 with a removable retaining pin 58. Turnbuckle 34 is pivotally secured to bracket 36 at one end with pin 37 and pivotally secured to bracket 26 at its other end with pin 39.

Turnbuckle 34 is preferably of the known type including an outer sleeve threaded about a pair of longitudinally aligned extended threaded members that may be longitudinally extended or retracted by twisting the sleeve about the extended threaded members. Other longitudinally extensible links could be used, such as a hydraulic cylinder for example. Soil working portion 14 may be pivoted on hitch portion 12 about retaining pins 58 by extending or retracting turnbuckle 34.

In use, implement 10 is hitched to a towing vehicle, such as a truck, tractor, lawn tractor, four wheeler, etc., and dragged over the soil in a path behind the towing vehicle. The weight of the implement 10 causes its scarifying teeth 20 to penetrate into the soil to loosen the soil, and its rake tines 18 follow to smooth the furrows created by the scarifying teeth. The penetration depth of teeth 20 into the soil may be adjusted by raising or lowering the teeth within brackets 22. The penetration depth of teeth 20 may also be controlled by varying the angle of attack of the teeth into the soil. The angle of attack of teeth 20 into the soil may be adjusted by pivoting the soil engaging part 14 about the hitch part 12 through the use of turnbuckle 34. An acute angle of attack will cause the teeth to pull the entire implement down into the soil as it is dragged across the soil whereas an obtuse angle of attack will not urge teeth deeper into the soil. Soil engaging part 14 may be pivoted between limits where either only the scarifying teeth 20, only the rake tines 18 engage the soil, or intermediate positions where both the teeth and the tines engage the soil. Teeth 20 may also be completely removed from brackets 22 so that only the rake tines 18 engage the soil to smooth the soil without first scarifying it.

The detailed description hereinbefore related is only meant to exemplify the invention to enable those skilled in the art to make and use it. The subject invention is not to be limited to the details given above for the preferred embodiment, but may be modified within the scope of the impending claims.

The invention claimed is:

1. A soil working implement adapted for being pulled behind a tow vehicle, said implement comprising a soil working part for engaging the soil, a hitch part pivotally connected to said soil working part and including a hitch adapted for connection to said tow vehicle, and extensible linkage connected to said soil working part, said extensible linkage having an extended position and a retracted position, said soil working part pivotally shiftable about said hitch part in response to the shifting of said extensible linkage between its said extended and retracted positions, said soil working part including a transverse frame member, a plurality of transversely spaced downwardly projecting scarifying teeth carried by said frame member for penetrating the soil, a plurality of transversely spaced tines carried by said frame member for engaging said soil, said hitch part including a hitch bar carrying said hitch and being pivotally connected to said frame member, said teeth located between said hitch and said tines, said extensible linkage pivotally connected at one end to said frame member and at the other end to said hitch bar, the angle of engagement of said teeth and tines with said soil being adjustable by shifting said extensible linkage between its extended and retracted positions.

2. The soil working implement of claim 1 wherein said scarifying teeth are removably carried by said frame member so as to permit only said tines to engage the soil.

3. The soil working implement of claim 1 wherein at least one of said teeth and tines constitutes means for supporting said implement upon the ground.

* * * * *